Patented Aug. 2, 1927.

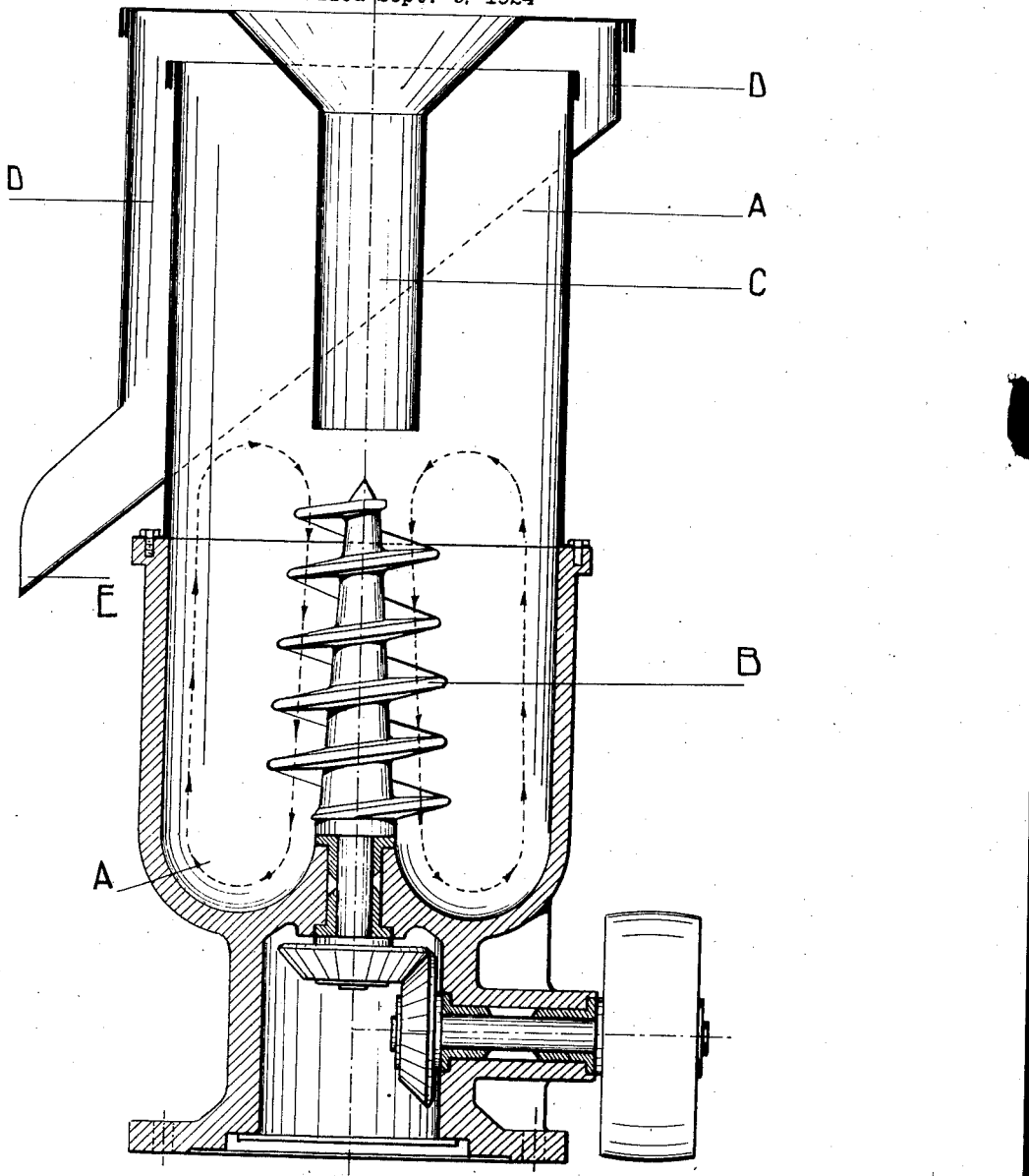

1.637.678

UNITED STATES PATENT OFFICE.

STEFANO CAMILLA AND FEDERICO PAGLIANI, OF TURIN, ITALY.

APPARATUS FOR CLEANING, PEELING, OR SHELLING CORN, GRAINS, AND THE LIKE.

Application filed September 9, 1924, Serial No. 736,742, and in Italy September 11, 1923.

This invention relates to apparatus for cleaning, peeling or shelling corn, grain, or the like, of the type in which the grain or the like is kept in continuous circulation within a container by means of a rotating worm centrally arranged, and projecting upwards from the bottom, of the container.

In apparatus of this type as previously proposed the arrangement was such that the worm reached substantially to the top of the grain within the container, whereby all the grain was caused to be in motion, and the pressure on the grain was negligible.

In apparatus for cleaning grain in which a horizontal worm rotates within a container, it has already been proposed that the grain should be subjected to a rubbing action under pressure.

With the improved apparatus according to the present invention, the grains may remain under the peeling and shelling action through all the time required to completely treat them in one operation, and moreover, there is no necessity for any additional device either for providing a working pressure over the grains or for completing their treatment, and the rubbing action of the grains against each other will be of moderate intensity, thereby avoiding any breaking of the grains.

The present invention consists in an improved apparatus for cleaning, peeling or shelling corn, grain, or the like of the type first hereinbefore referred to, in which the container substantially consists of two portions, one of which contains the material operated by the worm, while the other contains practically stationary material causing a pressure upon the mass in motion.

Reference will be had to the annexed drawing diagrammatically showing in a vertical sectional view an embodiment of the invention by way of example only.

The apparatus according to this invention consists of a pot-like receptacle A, the closed bottom of which presents a depressed annular surface semicircular in cross section, a centrally mounted worm B, a supply main C, a discharge hopper D and a discharge duct E.

When in operation the receptacle A is filled with corn, grain and the like up to its upper edge. By means of a rotary motion the worm B will draw the corn downwards and force same to reascend along the wall of the receptacle A, so that in the lower portion of the said receptacle a current will be set up toward the bottom near the worm and toward the top near the walls, while at a certain distance above the worm the grain will no longer be subjected to any such drawing action. Owing to the friction of the grains against each other and against the worm and wall and because of the pressure exerted by the overlying mass, the treatment (manipulation) of the grains will take place.

In order to provide for a continuous supply, the apparatus is provided with a centrally situated supply main or duct C, in line with the worm B, and extending through the upper portion of the receptacle A, through which duct the corn or grain to be treated is continuously and regularly fed. The corn will be drawn in by the worm B and by mixing with the grain already treated will be treated in its turn. The addition of fresh corn will cause the grain already treated to slowly rise to the upper portion of the recipient A and to overflow into the hopper D and issue out of the discharge E.

According to whether dry or moist corn or the like is treated, and by regulating the amount of supply, or the speed of the worm, or generally by varying the sizes of the several members in the apparatus, different kinds and degrees of treatment may be obtained.

What we claim is:

Apparatus for cleaning, peeling or shelling corn, grain, and the like, comprising a cylindrical container with open upper end and closed bottom presenting a depressed annular surface semicircular in cross section; an upwardly projecting rotatable worm mounted in the bottom centrally of the annular surface, the shaft of said worm extending axially through the bottom portion of the container; means for rotating said worm; an upper portion provided in said container as an extension of said bottom portion above the point of application of the downwardly drawing force of said worm; a centrally situated supply duct extending through the said upper portion of the container, said duct being arranged in line with said worm and adapted to directly and continuously supply the bottom portion of the container, and a discharge hopper for the continuous discharge of the grain already treated surrounding the upper edge of the container.

In witness whereof, we have hereunto signed our names.

STEFANO CAMILLA.
FEDERICO PAGLIANI.